Feb. 9, 1954  B. B. McHAN  2,668,749
PROCESS OF PREPARING CALCIUM CARBONATE COMPOSITION
Filed Oct. 4, 1948
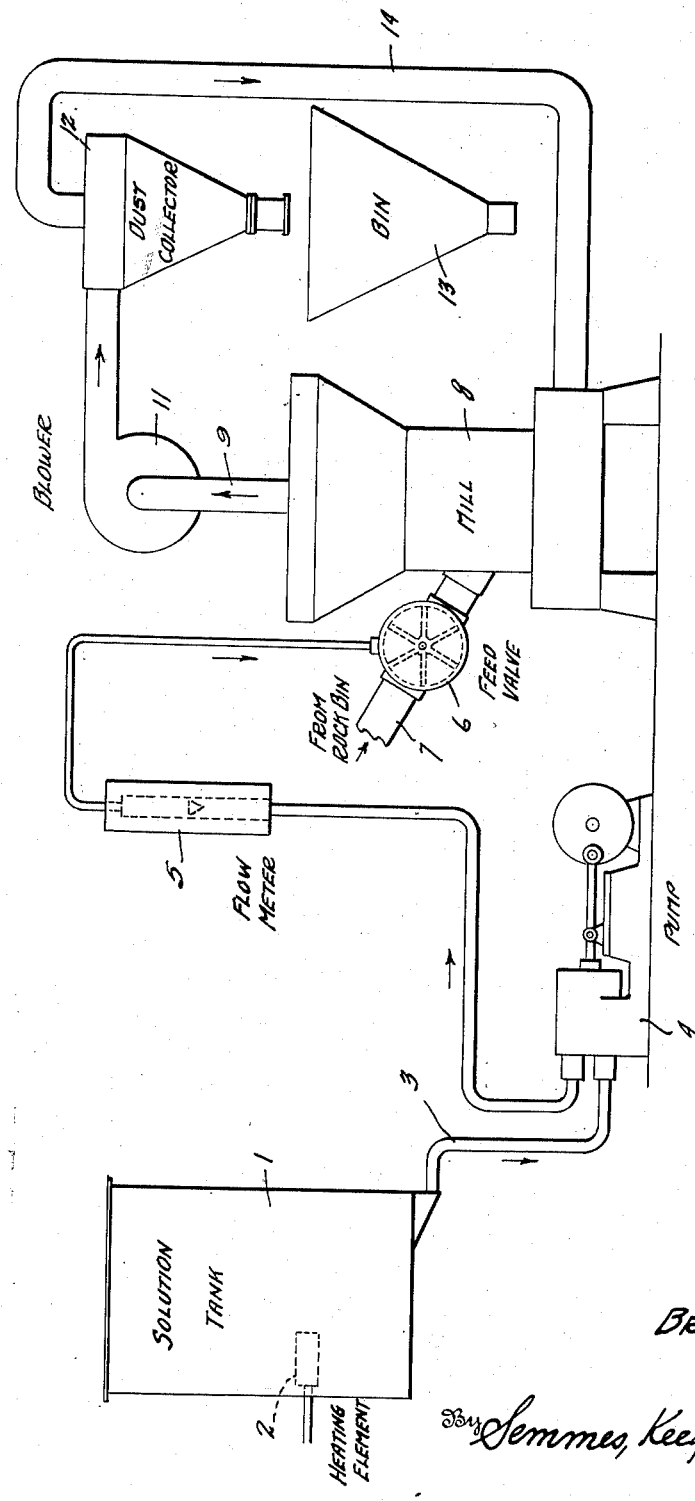
Inventor
BRACK B. McHAN
By Semmes, Keegin & Semmes
Attorneys Patented Feb. 9, 1954

2,668,749

UNITED STATES PATENT OFFICE 2,668,749

PROCESS OF PREPARING CALCIUM CARBONATE COMPOSITION

Brack B. McHan, Quincy, Ill., assignor to Calcium Carbonate Company, Chicago, Ill., a corporation of Illinois Application October 4, 1948, Serial No. 52,755

13 Claims. (Cl. 23—66)

This invention relates to calcium carbonate, and more particularly has reference to an improved dry pulverized limestone.

This is a continuation-in-part of my copending application, Serial No. 418,618, filed November 10, 1941, now abandoned, which was a continuation-in-part of my application, Serial No. 199,983, filed April 4, 1938, now abandoned, which was a continuation-in-part of my application Serial No. 44,997, filed October 14, 1935, now abandoned.

The pulverized calcium carbonate heretofore available has been open to certain serious objections. In the first place, it has had a tendency to agglomerate and cake on storing over long periods, and thereby prevent a free flow of the material, thus rendering it difficult to handle around a factory or plant. This caking also inhibits a uniform distribution of the material where it is used, particularly in mixtures of solids. Furthermore, the prior forms of calcium carbonate have not been water resistant or readily wettable in oil.

It has been found that the foregoing limitations of the calcium carbonate heretofore available can be overcome, and furthermore that the calcium carbonate treated in accordance with this invention serves as an anti-oxidant. This last-mentioned property is of real significance when calcium carbonate forms one of the ingredients of a feed containing potassium iodide, for it tends to stabilize the potassium iodide. It has furthermore been determined that the dispersed calcium carbonate of this invention exhibits a remarkable stabilizing effect for beta carotene and vitamin A contained in various feed ingredients when the dispersed calcium carbonate is employed in conjunction with potassium iodide. The same effect is obtained to a slightly lesser extent for cod liver oil or vitamin D contained in various feed ingredients and for green feeds.

In general, my invention embraces the idea of treating calcium carbonate with a higher fatty acid, either saturated or unsaturated, which contains from 10 to 22 carbon atoms or derivatives thereof. More specifically, the calcium carbonate in a dry state has added to it a small per cent (less than 0.3% by weight) of a higher fatty acid as for example capric, abietic, lauric, stearic, oleic, erucic and perilla oil, tall oil, or linseed oil fatty acids or alkali metal salts thereof such as sodium or potassium oleate, or stearate. The calcium carbonate is then ground dry to a pulzerized condition. Moreover the inventive concept herein also embraces the preparation of a pulverized, highly dispersed, and antioxidant calcium carbonate feed composition, particularly feeds including potassium iodide, either with or without vitamins, and also its use as a rock dust in the dusting of mines, and as a carrier for an insecticide.

In the accompanying sheet of drawings, there is depicted a schematic arrangement for treating the calcium carbonate to secure the desired product.

In this drawing it will be noted that a solution tank I is provided, preferably heated by an element 2 to maintain the solution liquefied in all weathers. In carrying out the process, any saturated or unsaturated higher fatty acid having from 10 to 22 carbon atoms may be employed, but in view of the economy both financially and as to time of reaction it is preferred to use oleic or stearic acid or an alkali metal salt of these acids, especially sodium oleate. In this connection, it has been found that sodium oleate is especially desirable because of its ease in handling and uniformity of distribution in the calcium carbonate. In describing the invention the preferred embodiment comprising oleic acid and sodium oleate will be hereinafter mentioned, it being understood however that other saturated or unsaturated higher fatty acids having from 10 to 22 carbon atoms or their derivatives may be substituted for oleic acid and sodium oleate.

A suitable solution of sodium oleate may be prepared by saponifying oleic acid with a slight excess of sodium hydroxide to give a resultant solution alkaline in nature and containing approximately 15% sodium oleate. For instance, approximately 10¼ pounds of oleic acid may be placed in substantially 40 pounds of water, and this solution permitted to react with the solution of sodium hydroxide formed by dissolving approximately 1 pound 12¾ ounces of sodium hydroxide in 7½ pounds of water, the mixture being boiled until saponification of the oleic acid is complete.

The reagent from tank I is passed through a line 3 in which is interposed a pump 4 and flow meter 5, to a feed valve 6. The feed valve 6 is located in the conduit 7, which carries the crushed rock up to 2 and 3 inches in diameter from the rock bin to the mill 8.

Mill 8 is preferably a ring roll or hammer mill suitable for receiving relatively large pieces of limestone and discharging finely ground material at a high rate of production such as, for example, 5 to 7 tons per hour. Ordinarily the limestone is subjected to the action of the grinding apparatus for only a short time, not over about one to three minutes and in some instances considerably less than a minute. This short grinding period is sufficient for distribution of the sodium oleate on the limestone and to produce a particle size comparable to that of untreated limestone when used in the preparation of feeds. Excessive fines are to be avoided because of the increased dust losses resulting therefrom. A typical product has the following particle size.

| Micron Size | Percent | Cumulative Total |
| --- | --- | --- |
| −1 | 0.0 | 0.0 |
| 1–5 | 14.5 | 14.9 |
| 5–10 | 16.2 | 31.1 |
| 10–20 | 16.5 | 47.6 |
| 20–30 | 11.6 | 59.2 |
| 30–40 | 8.7 | 67.9 |
| 40–50 | 7.2 | 75.1 |
| 50–60 | 5.9 | 81.0 |
| 60–70 | 4.4 | 85.4 |
| 70–80 | 4.1 | 89.5 |
| 80–90 | 4.0 | 93.5 |
| 90–100 | 3.7 | 97.2 |
| 100–105 | 2.0 | 99.2 |

While this invention contemplates that the reagent may be fed to the rock during the pulverizing step, it is definitely preferable to feed the reagent to the rock prior to pulverizing.

While the amount of sodium oleate or oleic acid fed to the rock may be varied within a certain range, it has been found that the ratio of the reagent to limestone is roughly from .025% to 0.3%, and this range appears to be critical, for departure therefrom, particularly the upper limit, will nullify the results. The addition of more than 0.3% of the higher fatty acids or their derivatives has in no instance been found to improve the characteristic of our product, and is generally harmful in making the product less easily dispersed. Under most conditions .1% is used to secure maximum results. In terms of the 15% sodium oleate solution, it will be noted that the range will be from 0.5 gallon to 4 gallons of the solution per ton of limestone, and when oleic acid is the reagent, it will mean from ½ pound to 6 pounds of oleic acid per ton of limestone.

It will, of course, be appreciated that when the sodium oleate solution is used as the reagent, the small relative amount of such liquid will have an insignificant effect upon the moisture of the rock, for the reagent is fed by means of a suitable chemical feeding device, such as is well known in the art. The reaction, therefore, will proceed while the limestone is thoroughly dry.

Referring to the drawings, it will be noted that the pulverized rock is withdrawn through the pipe 9 by means of a blower 11 and passes to a dust collector 12. The dust is collected by the collector 12, and the pulverized material passes to a bin 13, while the air is returned to the mill through pipe 14.

The above discussion of the preferred embodiment of this invention is limited to oleic acid and sodium oleate. However, other higher fatty acids may be substituted in the process. When capric, stearic, abietic, lauric, and perilla oil, tall oil, or linseed oil fatty acids or their derivatives were employed in amount up to 0.3 percent by weight of the limestone, substantially the same degree of dispersion was obtained as when oleic acid or sodium oleate was used. In the case of erucic acid or salts of erucic acid the pulverized product obtained was not as highly dispersed as in the case of the other higher fatty acids or derivatives thereof. Other saturated or unsaturated higher fatty acids having between 10 to 22 carbon atoms which have not been specifically disclosed herein are also applicable in the process of this invention. However, the higher fatty acids disclosed herein comprise those readily available on the market at a price reasonable enough to warrant their use in the process of this invention economically.

The product secured by treating calcium carbonate in the foregoing manner is in a highly dispersed condition and also effectively repels water. It is capable of many diverse uses, but these properties render it particularly desirable in mine dusting and when used in an insecticide. When used as a rock dust for coal mines, its high dispersivity insures an effectiveness not possible with ordinary calcium carbonate or other previously used products which have a tendency to agglomerate. The resistance to caking on storing makes the product available for immediate efficient use when needed, while its water-repellent property is decidedly advantageous in that it prevents the dust from becoming damp to increase further its effectiveness. This last is of real significance, for one of the problems in mine dusting has been to secure dust that does not absorb some of the dampness which is so prevalent in coal mines. Obviously, when the dust becomes wetted, it forms into lumps, and is thus rendered ineffective in preventing explosions of mine dust.

As stated, the dispersed condition and the water-repellent characteristic of the product renders it particularly suitable for use as a carrier in an insecticide. Its dispersivity, of course insures an adequate distribution of the insecticide throughout the desired area and would appear to create an electro-chemical attraction to the leaf structure, for the insecticide forms a more or less tightly adhered and continuous layer on the leaves—having to a remarkable degree the property of "spreading." As indicated, the product is highly water repellent, and tenaciously adheres to the leaf surface notwithstanding heavy dews and even protracted periods of rain.

It should be pointed out that, when used in an insecticide, the product of this invention is not only itself in a highly dispersed state, but also serves as a dispersing reagent for other ingredients of the insecticide which are highly aggregated. Such highly aggregated ingredients are frequently present in insecticides, and this is particularly true in the case of dusting sulphurs.

When the calcium carbonate is used in the preparation of an animal feed, potassium iodide is often mixed therewith. While the potassium iodide is an important part of the feed, it is usually present in very small quantities, the ratio of the weight of potassium iodide to calcium carbonate usually lying within the range of 0.25:1000 to 5:1000. Untreated calcium carbonate, especially when present in such large amounts, tends to oxidize potassium iodide and hasten its decomposition. However, as heretofore pointed out, the dispersed calcium carbonate acts as a stabilizer, particularly with respect to potassium iodide and the dispersed calcium carbonate in conjunction with potassium iodide acts as a stabilizer for vitamins. Inasmuch as both potassium iodide and the vitamins decompose through what appears to be processes of oxidation, the product of this invention serves to stabilize them. This is of particular value in the case of feeds, which frequently have as normal ingredients calcium carbonate, potassium iodide and certain vitamin values, such as cod liver oil (vitamin D), beta carotene (vitamin A) and green feeds; and these feeds frequently also contain ingredients which tend to accelerate oxidation of potassium iodide and vitamins. For instance, it has been found that when calcium carbonate, treated as above mentioned, it incorporated as an ingredient of a feed containing potassium iodide and vitamins such as found in cod liver oil, fish liver oils, beta carotene and green feeds, the decomposition of such iodide and vitamins is remarkably inhibited. This stabilizing effect is believed to be due to the protection of the potassium iodide from the oxidizing elements present in the limestone by virtue of the coating of the limestone particles and the potassium iodide with the calcium soaps of the higher fatty acids. They may also further exert a stabilizing effect by inhibiting ionization of oxidizing compounds that might be present.

It has been definitely determined by experimental work that vitamins, particularly beta-carotene and vitamin A are stabilized to a relatively high degree in the presence of calcium carbonate treated with potassium iodide. However potassium iodide is not stable in straight calcium carbonate mixtures and it is necessary that the calcium carbonate be dispersed with the higher fatty acids disclosed or their derivatives to effectively stabilize the potassium iodide in the calcium carbonate. The stable calcium carbonate and higher fatty acids in conjunction with the potassium iodide effectively stabilizes vitamins and particularly beta-carotene and vitamin A. It has been found that vitamin A or beta-carotene mixed with straight calcium carbonate will lose all of its potency in less than five days. However, calcium carbonate dispersed with the higher fatty acids or derivatives thereof, according to this invention, in conjunction with potassium iodide will provide an average of seventy-five percent stabilization of the potency of vitamin A or beta carotene for several months. This phenomena is especially interesting since it has been found that potassium iodide alone does not function as a stabilizer for vitamin A or beta carotene. The product of this invention therefore, supplies the normal calcium carbonate requirement in the feed, and at the same time serves to prevent the loss of iodine and vitamin values. For this reason, as well as because of its high miscibility resulting from its dispersed condition, the product is a valuable feed ingredient.

The animal feed with which the treated calcium carbonate is employed may vary widely, depending on its particular purpose. Generally the treated limestone will be added to the animal feed in quantities amounting to about 1 to 4% of the weight of the feed. Because of its effect in stablizing vitamins, the treated limestone is of special value in feeds that have been enriched with vtiamin preparations. Without limiting the invention to any particular animal feed, and merely to illustrate one type of feed in which the treated and iodized calcium described herein may be used to advantage, the use of the treated calcium carbonate in a poultry feed prepared from the materials listed below has been found beneficial.

| | Per cent |
|---|---|
| Gnd. corn | 29.40 |
| Gnd. oats | 12.26 |
| Hominy feed | 9.80 |
| Wheat bran | 9.80 |
| St. Wh. middlings | 9.80 |
| Soybean oil meal | 12.26 |
| Alfalfa 17% D meal | 7.36 |
| Meat scrap 50% | 4.90 |
| Clay phosphate | 1.23 |
| Iodized limestone 0.05% KI | 1.96 |
| Vitamin mix, mineral mix, etc | 1.23 |

Instead of treating the calcium carbonate and then incorporating the mixture directly into a feed containing an iodide salt in the manner just described, the process may be shortened and a superior product produced by introducing the reagent, such as, for example, a 20% solution of oleic acid, or other suitable fatty acid directly into the mill during the grinding process and adding the potassium iodide in the form of a separate solution at the same time. This results in an intimate contact of the potassium iodide and sodium oleate and results in a highly stabilized produce. The following chart discloses the percentage of iodine loss in limestone prepared in this manner.

*Percentage of iodine loss in iodized ground limestone*

[2.35 lbs. potassium iodide per ton]

| Sample | Percent Loss After 9 wks. | Percent Loss After 18 wks. | Percent Loss After 38 wks. |
|---|---|---|---|
| CCC-5-34 Q.: | | | |
| Reg | 7.30 | 20.33 | 50.0 |
| ⅜ | 6.42 | 11.70 | 22.9 |
| Full | 2.25 | 3.35 | 3.6 |
| CCC-5-34 W.: | | | |
| Reg | 5.37 | 11.30 | 34.6 |
| ⅜ | 5.55 | 10.10 | 20.85 |
| Full | 3.33 | 4.08 | 8.2 |
| CCC-5-34 C.: | | | |
| Reg | 2.10 | 13.21 | 39.1 |
| ⅜ | 2.12 | 10.77 | 30.7 |
| Full | Nil | 2.32 | 6.75 |
| CCC-5-34 H.: | | | |
| Reg | 1.75 | 10.05 | 27.7 |
| ⅜ | 0.76 | 6.61 | 9.5 |
| Full | 0.02 | 3.17 | 4.09 |

MEAN PERCENT LOSS, ABOVE SAMPLES

| Sample | Mean Percent Loss After 9 wks. | Mean Percent Loss After 18 wks. | Mean Percent Loss After 38 wks. |
|---|---|---|---|
| Reg | 4.13 | 13.77 | 37.6 |
| ⅜ | 3.71 | 9.79 | 20.98 |
| Full | 1.40 | 3.23 | 5.41 |

"Reg." means regular calcium carbonate containing no oleic acid.
"⅜" means that only enough sodium oleate has been used to give approximately ⅜ surface coverage.
"Full" means that enough sodium oleate has been used to give complete surface coverage. This quantity is usually from 0.1% to 0.2%.

In following either the direct or indirect method described above of preparing the stabilized iodine mixture, it is believed that the sodium oleate reacts with the calcium carbonate to form calcium oleate and sodium carbonate. The calcium oleate is a semi-greasy unctuous compound that is more or less of colloidal structure. This compound spreads over and around the particles of calcium carbonate as well as the tiny particles of potassium iodide and acts as a protective colloidal coating which prevents the entry of water into and around the particles of potassium iodide, thereby effectively preventing ionization of either the potassium iodide or of any oxidizing compound which may be present. This protective colloidal coating with its ability to inhibit ionization effectively prevents the splitting up of the potassium iodide molecule which would result in the volatilization of the iodine. The mixture is therefore comparatively stable over long periods of time.

This is especially important when the potassium iodide, calcium carbonate mixtures are used in mixed feeds because such feeds contain a relatively large concentration of adsorbed air as well as oxidizing compounds, such as sodium chloride, that would very quickly decompose the unprotected or unstable potassium iodide molecules. The use of the iodide mixtures disclosed in this application avoids this difficulty.

I claim:

1. A method of preparing pulverized limestone resistant to caking on extended storing comprising metering from .025 to .3% by weight of a substance containing the oleate radical onto dry limestone rock as it is continuously fed into a continuous type pulverizer, and rapidly pulverizing the rock therein in the presence of said oleate substance to form a product in which the size of substantially all particles ranges from 1 to 100 microns in diameter, the limestone being pulverized and passing through the pulverizer in about three minutes or less.

2. A method of preparing pulverized limestone resistant to caking on extended storing comprising metering from .025% to .3% by weight of sodium oleate onto dry limestone rock as it is continuously fed into a continuous type pulverizer, and rapidly pulverizing the rock therein in the presence of the sodium oleate to form a product in which the size of substantially all particles ranges from 1 to 100 microns in diameter, the limestone being pulverized and passing through the pulverizer in about three minutes or less.

3. A method of preparing pulverized limestone resistant to caking on extended storing comprising metering from .025% to .3% by weight of a substance containing the stearate radical onto dry limestone rock as it is continuously fed into a continuous type pulverizer, and rapidly pulverizing the rock therein in the presence of said stearate substance to form a product in which the size of substantially all particles ranges from 1 to 100 microns in diameter the limestone being pulverized and passing through the pulverizer in about three minutes or less.

4. A process for the manufacture of a pulverized limestone resistant to caking when stored for extended periods comprising metering an aqueous solution containing approximately 15% by weight of an alkali metal salt of a higher fatty acid having ten to twenty-two carbon atoms per molecule onto dry limestone rock as it is fed into a continuous type pulverizer, rapidly pulverizing the mixture to form a product in which the sizes of substantially all particles range from about one to about one-hundred microns in diameter, said solution of an alkali metal salt of a higher fatty acid being added in amounts sufficient to enhance the resistance to caking but not exceeding the amount required to add about 0.3% of the salt by weight of the pulverized calcium carbonate, the limestone being pulverized and passing through the pulverizer in about three minutes or less.

5. In the process of rapidly pulverizing limestone rock wherein a stream of dry limestone rock is continuously fed into a pulverizer mill and the pulverized product is continuously removed from the mill, the improvement which renders the pulverized limestone non-caking and free-flowing which comprises, continuously metering onto the limestone rock as it is fed into said pulverizer mill from 0.025 to 0.3% based on the weight of the limestone rock of a substance containing a higher fatty acid radical having from 10–22 carbon atoms per molecule, said limestone being pulverized and passing through the pulverizer in periods of about three minutes and less.

6. A method of preparing pulverized limestone resistant to caking on extended storing comprising metering from 0.025 to 0.3% by weight of a fatty acid compound selected from the group consisting of oleic acid and alkali metal salts thereof onto dry limestone rock as it is continuously fed into a continuous type pulverizer, and rapidly pulverizing the rock therein in the presence of the fatty acid compound oleic acid to form a product in which the size of substantially all particles ranges from 1 to 100 microns in diameter, the limestone being pulverized and passing through the pulverizer in periods of about three minutes and less.

7. A method of preparing pulverized limestone resistant to caking on extended storing comprising metering from 0.025 to 0.3% by weight of a fatty acid compound selected from the group consisting of stearic acid and alkali metal salts thereof onto dry limestone rock as it is continuously fed into a continuous type pulverizer, and rapidly pulverizing the rock therein in the presence of the fatty acid compound stearic acid to form a product in which the size of substantially all particles ranges from 1 to 100 microns in diameter, the limestone being pulverized and passing through the pulverizer in about three minutes or less.

8. A method of preparing pulverized limestone resistant to caking on extended storing comprising metering from 0.025 to 0.3% by weight of a fatty acid compound selected from the group consisting of palmitic acid and alkali metal salts thereof onto dry limestone rock as it is continuously fed into a continuous type pulverizer, and rapidly pulverizing the rock therein in the presence of fatty acid compound palmitic acid to form a product in which the size of substantially all particles ranges from 1 to 100 microns in diameter, the limestone being pulverized and passing through the pulverizer in about three minutes or less.

9. A method of preparing pulverized limestone resistant to caking on extended storing comprising metering from 0.025 to 0.3% by weight of sodium stearate onto dry limestone rock as it is continuously fed into a continuous type pulverizer, and rapidly pulverizing the rock therein in the presence of sodium stearate to form a product in which the size of substantially all particles ranges from 1 to 100 microns in diameter, the limestone being pulverized and passing through the pulverizer in about three minutes or less.

10. A method of preparing pulverized limestone resistant to caking on extended storing comprising metering from 0.025 to 0.3% by weight of sodium palmitate onto dry limestone rock as it is continuously fed into a continuous type pulverizer, and rapidly pulverizing the rock therein in the presence of sodium palmitate to form a product in which the size of substantially all particles ranges from 1 to 100 microns in diameter, the limestone being pulverized and passing through the pulverizer in about three minutes or less.

11. A method of preparing pulverized limestone resistant to caking on extended storing comprising metering from 0.025 to 0.3% by weight of oleic acid onto dry limestone rock as it is continuously fed into a continuous type pulverizer, and rapidly pulverizing the rock therein in the presence of the oleic acid to form a product in which the size of substantially all particles ranges from 1 to 100 microns in diameter, the limestone being pulverized and passing through the pulverizer in periods of about three minutes and less.

12. A method of preparing pulverized limestone resistant to caking on extended storing comprising metering from 0.025 to 0.3% by weight of stearic acid onto dry limestone rock as it is continuously fed into a continuous type pulverizer, and rapidly pulverizing the rock therein in the presence of stearic acid to form a product in which the size of substantially all particles ranges from 1 to 100 microns in diameter, the limestone being pulverized and passing through the pulverizer in about three minutes or less.

13. A method of preparing pulverized limestone resistant to caking on extended storing comprising metering from 0.025 to 0.3% by weight of a fatty acid compound selected from the group consisting of oleic, stearic and palmitic acids and the alkali metal salts thereof onto dry limestone rock as it is continuously fed into a continuous type pulverizer, and rapidly pulverizing the rock therein in the presence of the fatty acid compound to form a product in which the size of substantially all particles ranges from 1 to 100 microns in diameter, the limestone being pulverized and passing through the pulverizer in periods of three minutes and less.

BRACK B. McHAN.

References Cited in the file of this patent

UNITED STATES PATENTS

| Number | Name | Date |
|---|---|---|
| 902,403 | Holloway | Oct. 27, 1908 |
| 1,264,092 | Kipper | Apr. 23, 1918 |
| 1,847,540 | Sanders | Mar. 1, 1932 |
| 1,863,945 | Shiraishi | June 21, 1932 |
| 1,869,518 | Smith | Aug. 2, 1932 |
| 1,952,886 | O'Brien | Mar. 27, 1934 |
| 2,034,797 | Church | Mar. 24, 1936 |
| 2,077,167 | Crouet | Apr. 13, 1937 |
| 2,177,269 | Sullivan | Oct. 24, 1939 |
| 2,198,223 | Muskat et al. | Apr. 23, 1940 |
| 2,211,510 | Meinecke | Aug. 13, 1940 |
| 2,211,796 | Schneider | Aug. 20, 1940 |
| 2,276,503 | McHan | Mar. 17, 1942 |
| 2,419,822 | Contesso | Apr. 29, 1947 |
| 2,433,297 | Schoenlaub | Dec. 23, 1947 |
| 2,438,890 | Baskin | Apr. 6, 1948 |

FOREIGN PATENTS

| Number | Country | Date |
|---|---|---|
| 405,791 | Great Britain | July 8, 1933 |

OTHER REFERENCES

"Hackh's Chemical Dictionary," 2nd ed., 1938, pp. 235 and 652.